(12) United States Patent
Jain et al.

(10) Patent No.: US 11,373,103 B2
(45) Date of Patent: Jun. 28, 2022

(54) ARTIFICIAL INTELLIGENCE BASED SYSTEM AND METHOD FOR PREDICTING AND PREVENTING ILLICIT BEHAVIOR

(71) Applicant: Accenture Global Solutions Limited, Dublin (IE)

(72) Inventors: Prateek Jain, Delhi (IN); Mamta Aggarwal Rajnayak, New Delhi (IN); Kanika C. Agarwal, Ghaziabad (IN)

(73) Assignee: Accenture Global Solutions Limited, Dublin (IE)

( * ) Notice: Subject to any disclaimer, the term of this patent is extended or adjusted under 35 U.S.C. 154(b) by 661 days.

(21) Appl. No.: 16/424,416

(22) Filed: May 28, 2019

(65) Prior Publication Data
US 2020/0380376 A1   Dec. 3, 2020

(51) Int. Cl.
| G06F 15/16 | (2006.01) |
| G06F 9/54 | (2006.01) |
| H04L 29/06 | (2006.01) |
| G06N 5/02 | (2006.01) |
| G06N 20/00 | (2019.01) |
| H04L 9/40 | (2022.01) |
| G06F 16/953 | (2019.01) |

(52) U.S. Cl.
CPC .............. *G06N 5/02* (2013.01); *G06F 16/953* (2019.01); *G06N 20/00* (2019.01); *H04L 63/101* (2013.01)

(58) Field of Classification Search
CPC ........ G06N 5/02; G06N 20/00; G06F 16/953; H04L 63/101
USPC .......................................................... 709/12
See application file for complete search history.

(56) References Cited

U.S. PATENT DOCUMENTS

| 5,666,157 A * | 9/1997 | Aviv ................ G08B 13/19613 348/161 |
| 6,904,168 B1 * | 6/2005 | Steinberg ............. G06V 40/161 382/165 |
| 10,255,352 B1 * | 4/2019 | Xu .......................... G06N 5/041 |
| 11,017,659 B1 * | 5/2021 | Trundle ................. G08B 13/00 |
| 11,194,915 B2 * | 12/2021 | Stolfo ..................... H04L 67/38 |
| 2004/0064351 A1 * | 4/2004 | Mikurak ............ G06Q 30/0269 705/22 |
| 2007/0214115 A1 * | 9/2007 | Liu ........................ G06F 16/951 |
| 2009/0248465 A1 * | 10/2009 | Recce .................. G06Q 40/025 705/38 |
| 2014/0045456 A1 * | 2/2014 | Ballai ................. H04W 12/128 455/410 |
| 2014/0129288 A1 * | 5/2014 | Eager ................. G06Q 30/0185 705/7.29 |

(Continued)

*Primary Examiner* — Hamza N Algibhah
(74) *Attorney, Agent, or Firm* — Plumsea Law Group, LLC

(57) ABSTRACT

An artificial intelligence based system and method for predicting and preventing illicit behavior is disclosed. The system and method may include obtaining search strings used by multiple users, as well as the clickstream data of such users. The search terms included in the search strings may be preprocessed and analyzed for inclusion of suspicious words, e.g., words related to illicit behavior, provided in a corpus of suspicious words. Information associated with the search strings containing suspicious words may be analyzed to identify users associated with the same search strings. The clickstream of the identified users may be analyzed to determine whether the users are likely to engage in illicit behavior. Preventive measures may be taken to prevent such users from engaging in such illicit behavior.

20 Claims, 10 Drawing Sheets

(56) References Cited

U.S. PATENT DOCUMENTS

| | | | |
|---|---|---|---|
| 2014/0195984 A1* | 7/2014 | Aslam | G06Q 50/265 |
| | | | 715/853 |
| 2015/0235152 A1* | 8/2015 | Eldardiry | G06F 21/552 |
| | | | 705/7.28 |
| 2016/0371968 A1* | 12/2016 | Almansour | H04L 63/123 |
| 2017/0011409 A1* | 1/2017 | Eager | G06Q 30/0201 |
| 2017/0017887 A1* | 1/2017 | Waradkar | G06Q 40/00 |
| 2018/0150750 A1* | 5/2018 | Verdejo | G06N 5/022 |
| 2018/0225275 A1* | 8/2018 | Oleynikov | G06F 16/353 |
| 2018/0293875 A1* | 10/2018 | Heier | G06F 16/437 |
| 2019/0027003 A1* | 1/2019 | Lobo | G08B 31/00 |
| 2019/0259033 A1* | 8/2019 | Reddy | G06N 5/02 |
| 2019/0377764 A1* | 12/2019 | Ryu | G06F 16/906 |

\* cited by examiner

ARTIFICIAL INTELLIGENCE BASED SYSTEM AND METHOD FOR PREDICTING AND PREVENTING ILLICIT BEHAVIOR

TECHNICAL FIELD

The present disclosure generally relates to predicting and preventing illicit behavior. More specifically, the present disclosure generally relates to an artificial intelligence based system and method for predicting and preventing illicit behavior.

BACKGROUND

People planning to engage in illicit behavior often use the internet to research methods and equipment needed to engage in illicit behavior and/or further their purpose in doing so. The clickstream data from this type of research can indicate that a person is planning to engage in illicit behavior, such as a crime. Analyzing clickstream data for suspicious behavior indicating a likelihood of committing illicit behavior can require large amounts of processing resources and time and can yield low quality results. Additionally, finding a user associated with the clickstream data is not always straightforward, especially when the user does not utilize a user identification ("ID").

There is a need in the art for a system and method that addresses the shortcomings discussed above.

SUMMARY

An artificial intelligence based system and method for predicting and preventing illicit behavior (or system and method) is disclosed. The system may include an end-to-end engine that builds machine learning models to find and identify suspicious users by analyzing live and/or historical internet (or internet usage) data. The system and method may enable authorities to pursue and identify those committing and/or preparing to engage in illicit behavior. Examples of illicit behavior that could be monitored with the disclosed system include criminal behavior, morally turpitudinous behavior, civilly prohibited behavior (i.e., activity that may incur civil liability, such as trade secret misappropriation), and the like.

The system and method may include obtaining search strings used by multiple users, as well as the clickstream data of such users. The search terms included in the search strings may be preprocessed and analyzed for inclusion of suspicious words, e.g., words related to illicit behavior, provided in a corpus of suspicious words. For example, in the case of trade secret misappropriation, suspicious words could relate to the circumvention of technical controls. Information associated with the search strings containing suspicious words may be analyzed to identify users associated with the same search strings. Clubbing of clickstream data related to the search strings can help match users without known user IDs to users with known user IDs. This matching can help identify users who are not logged in with user IDs, or who are accessing using identification blocking functionality (e.g., privacy mode) during their searches containing suspicious terms. The clickstream of the identified users may be analyzed to determine whether the users are likely to engage in illicit behavior. Preventive measures are taken to prevent such users from engaging in the illicit behavior. In some embodiments, the location of suspicious users may be used to identify geographic areas that are more susceptible to illicit behavior.

The system and method may also be used to predict other outcomes than the likelihood of users engaging in illicit behavior. For example, the system and method may be used to predict population migration/relocation of people. In such embodiments, the clickstream behavior of users may be used to generate the probability that the user will relocate to another city. In response to identified migration trends, the concerned authority can then take measures for better city planning and curb the movement of people.

In another example embodiment, the system and method may be used to predict the efficiency and/or productivity of a farmer. In such an embodiment, a farmer's clickstream data may be analyzed to determine the time and effort spent planning and conducting activities correlated with efficient and productive farming. For example, in some embodiments, a farmer's clickstream data may be analyzed to identify online purchases and/or time spent studying agricultural techniques. The farmer's efficiency and/or productivity could be scored as low, medium, or high. The identification of farmer efficiency could be used to calculate an average productivity index for various groupings, e.g., geography, demography, and socio-economic status.

In one aspect, the disclosure provides an artificial intelligence based method of predicting and preventing illicit behavior. The method may include: obtaining internet data, including search string data and clickstream data, wherein the search string data includes one or more words; analyzing the search string data to identify a search string containing one or more words that match with one or more suspicious words provided in a suspicious word corpus; identifying a user associated with the identified search string; analyzing the clickstream data associated with the identified user to assign a score to the user based upon the likelihood that the user will engage in illicit behavior; and performing a preventive measure based upon the score.

In another aspect, the disclosure provides a non-transitory computer-readable medium storing software that may comprise instructions executable by one or more computers which, upon such execution, cause the one or more computers to: obtain internet data, including search string data and clickstream data, wherein the search string data includes one or more words; analyze the search string data to identify a search string containing one or more words that match with one or more suspicious words provided in a suspicious word corpus; identify a user associated with the identified search string; analyze the clickstream data associated with the identified user to assign a score to the user based upon the likelihood that the user will engage in illicit behavior; and perform a preventive measure based upon the score.

In another aspect, the disclosure provides an artificial intelligence based system for predicting and preventing illicit behavior. The system may include one or more computers and one or more storage devices storing instructions that are operable, when executed by the one or more computers, to cause the one or more computers to: obtain internet data, including search string data and clickstream data, wherein the search string data includes one or more words; analyze the search string data to identify a search string containing one or more words that match with one or more suspicious words provided in a suspicious word corpus; identify a user associated with the identified search string; analyze the clickstream data associated with the identified user to assign a score to the user based upon the likelihood that the user will engage in illicit behavior; and perform a preventive measure based upon the score.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The disclosed artificial intelligence based system and method for predicting and preventing illicit behavior may predict illicit behavior by looking for suspicious words in user search strings, identifying the users associated with the search strings containing the suspicious words, and then analyzing the identified user's clickstream data to determine the likelihood that the identified user may engage in illicit behavior. The system and method may prevent the illicit behavior by performing preventive measures. For example, in some embodiments, preventive measures may include one or more of: notifying an authority of the predicted illicit behavior; blocking a user from a particular website or webpage; blocking a user from purchasing a particular product or service; and continuing to monitor the user's clickstream data.

The use of two levels of analysis (e.g., analyzing search strings and clickstream data) improves the speed and efficiency of the method of predicting illicit behavior by filtering out data requiring analysis during the first level, such that less data is analyzed during the second level. For example, by filtering out the search strings that do not include suspicious words, only the remaining search strings (which include suspicious words) are processed to identify the users associated with the remaining search strings. Thus, less computing resources and time are needed to process the remaining search strings. Also, less computing resources and time are needed to analyze the clickstream data of the identified users.

The use of two levels of analysis also improves the accuracy of the method of predicting illicit behavior by identifying users fitting two different criteria associated with predicting illicit behavior. In other words, the users identified as being likely to engage in illicit activity are those using suspicious search terms in addition to being associated with clickstream data indicating potential illicit activity. Users matching both criteria are more likely to engage in illicit activity than those matching only one of the criteria.

The disclosed system and method may include identifying a user ID associated with a likelihood of engaging in illicit activity. The process of identifying a user ID may be successful even when a search string is obtained without any user ID information. Thus, disclosed system and method improve the prediction and prevention of illicit activity by identifying who to target with preventive measures.

The disclosed system and method may include applying multiple machine learning models to multiple batches of data, as discussed in more detail below. This batch processing increases the speed and efficiency of the system and method while also reducing the use of computational resources. Running multiple machine learning models on the same information provides more accurate results and helps identify which machine learning model is the most accurate.

Figure 1:
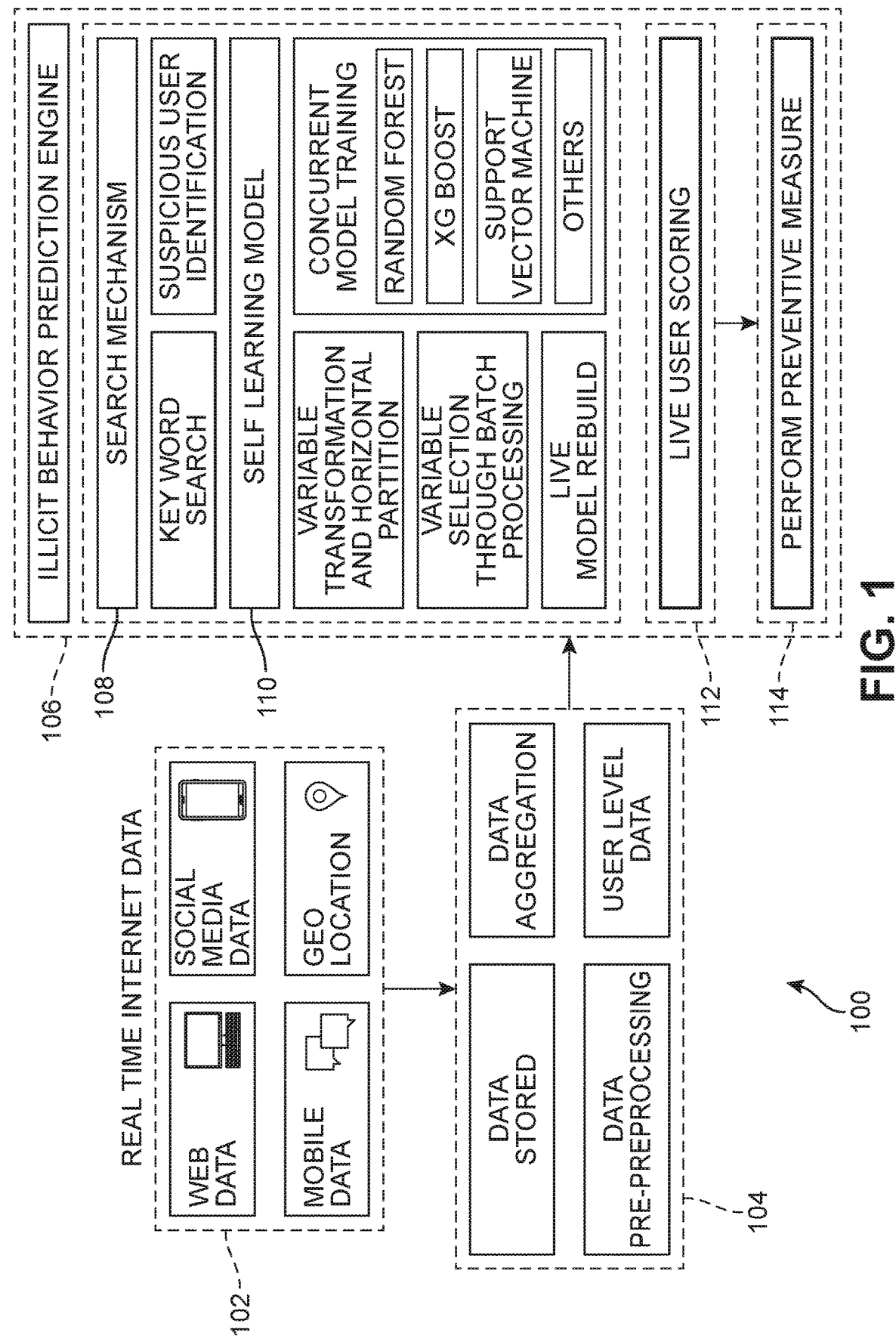
FIG. 1 is a schematic diagram of an embodiment of an artificial intelligence based system for predicting and preventing illicit behavior.

FIG. 1 is a schematic diagram of an embodiment of a system for predicting and preventing illicit behavior 100 (or system 100). The system for predicting and preventing illicit behavior may include real time internet data. For example, system 100 includes real time internet data 102 that has been obtained via an operation discussed in more detail below with respect to FIG. 10. As discussed below, the real time data is obtained from one or more servers and computers. In some embodiments, real time internet data may include web data, social media data, mobile data, and geo-location data. In other embodiments, other types of internet data may be obtained. System 100 includes a data module 104 where data is processed and/or stored. System 100 includes an illicit activity prediction engine 106. In an example embodiment, system 100 includes one or more computers configured to implement at least the illicit activity prediction engine. The computer (e.g., a processor or group of processors) may be configured to receive data and perform the disclosed method. Illicit activity prediction engine 106 includes a search mechanism 108, a self-learning model 110, live user scoring 112, and performance of a preventive measure 114.

Figure 10:
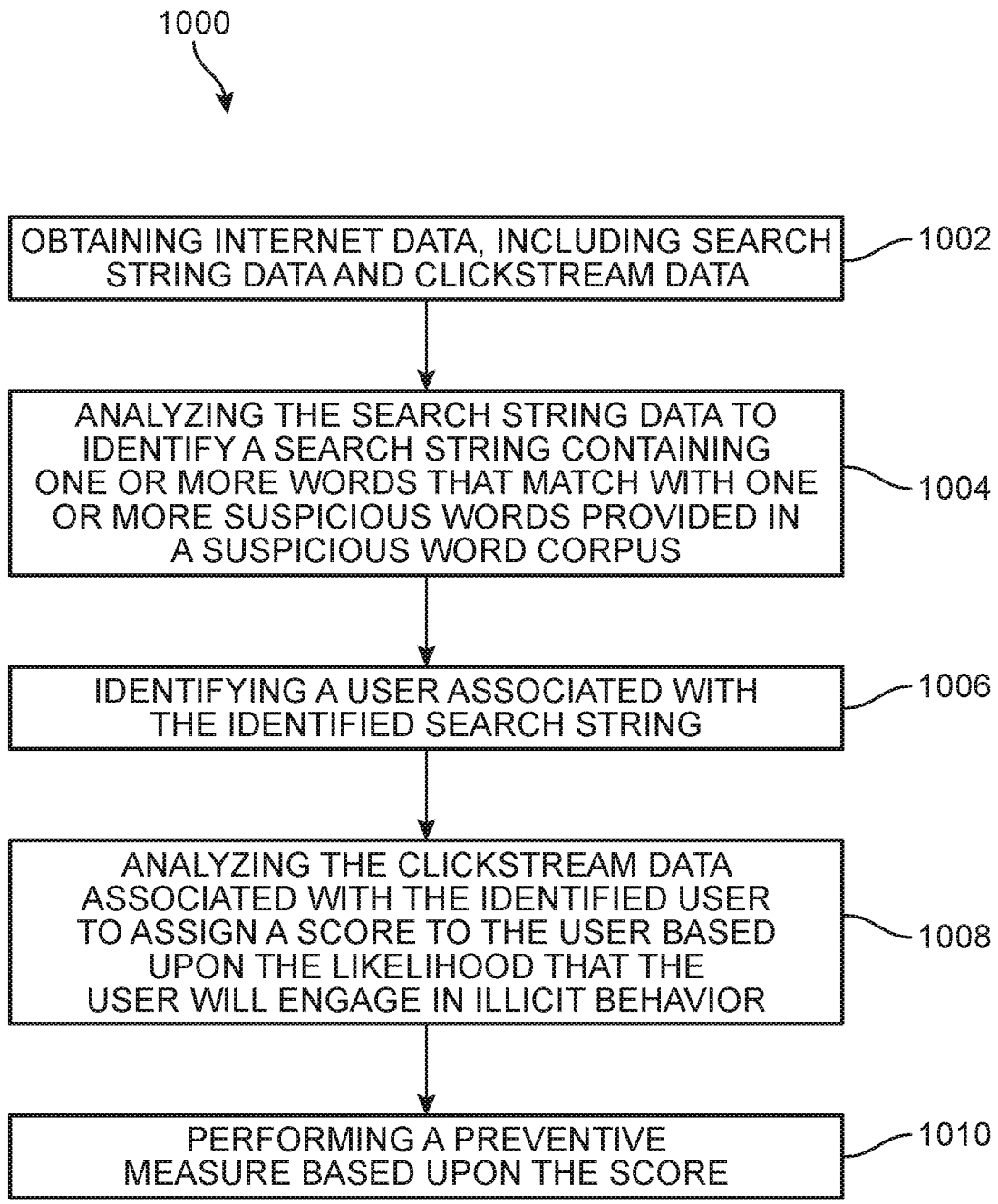
FIG. 10 is a schematic diagram of an embodiment of an artificial intelligence based method of predicting and preventing illicit behavior.

FIG. 10 is a schematic diagram of an embodiment of an artificial intelligence based method of predicting and preventing illicit behavior 1000 (or method 1000). The system and method may include obtaining internet activity data. For example, method 1000 includes obtaining internet data (operation 1002). In some embodiments, the internet activity data may include clickstream data of users, as well as search string histories of users. This internet activity may be collected as history and/or as live data in real time. The internet data may be collected or gathered from one or more computers or servers. The computers may be within user devices (e.g., tablet computers, smartphones, laptop computers, desktop computers, or other types of computing devices). For example, in some embodiments, the internet data may be collected from the user devices of multiple users. In some embodiments, the internet data may be collected from servers. For example, the internet data may be collected from servers of web services companies (e.g., search engines, social media, or cloud providers). By collecting internet activity data in real time, the internet activity may be analyzed as it occurs. By collecting past internet activity data, this past data may be used to enhance the analysis of the real time, live data.

In some embodiments, obtaining internet activity data may include gathering or collecting internet activity data from various sources. For example, in some embodiments, gathering or collecting may include uploading data from a cloud platform, e.g., Google Cloud Platform or Amazon Web Services. In another example, as shown in the embodiment of FIG. 1, the internet activity data may include web data, social media data, mobile data, and geolocation data.

In some embodiments, the clickstream data may include the websites and webpages visited by users. In some embodiments, search string data may include search terms and/or search phrases typed into a search bar of search engines (examples of search strings are shown at 202).

The method may include analyzing the search string data to identify a search string containing one or more words that match with one or more suspicious words provided in a suspicious word corpus. For example, method 1000 includes analyzing the search string data to identify a search string containing one or more words that match with one or more suspicious words provided in a suspicious word corpus (operation 1004). Analyzing the search string data may include preprocessing the words in the search string to get the words into a form that is easier to process.

Figure 2:
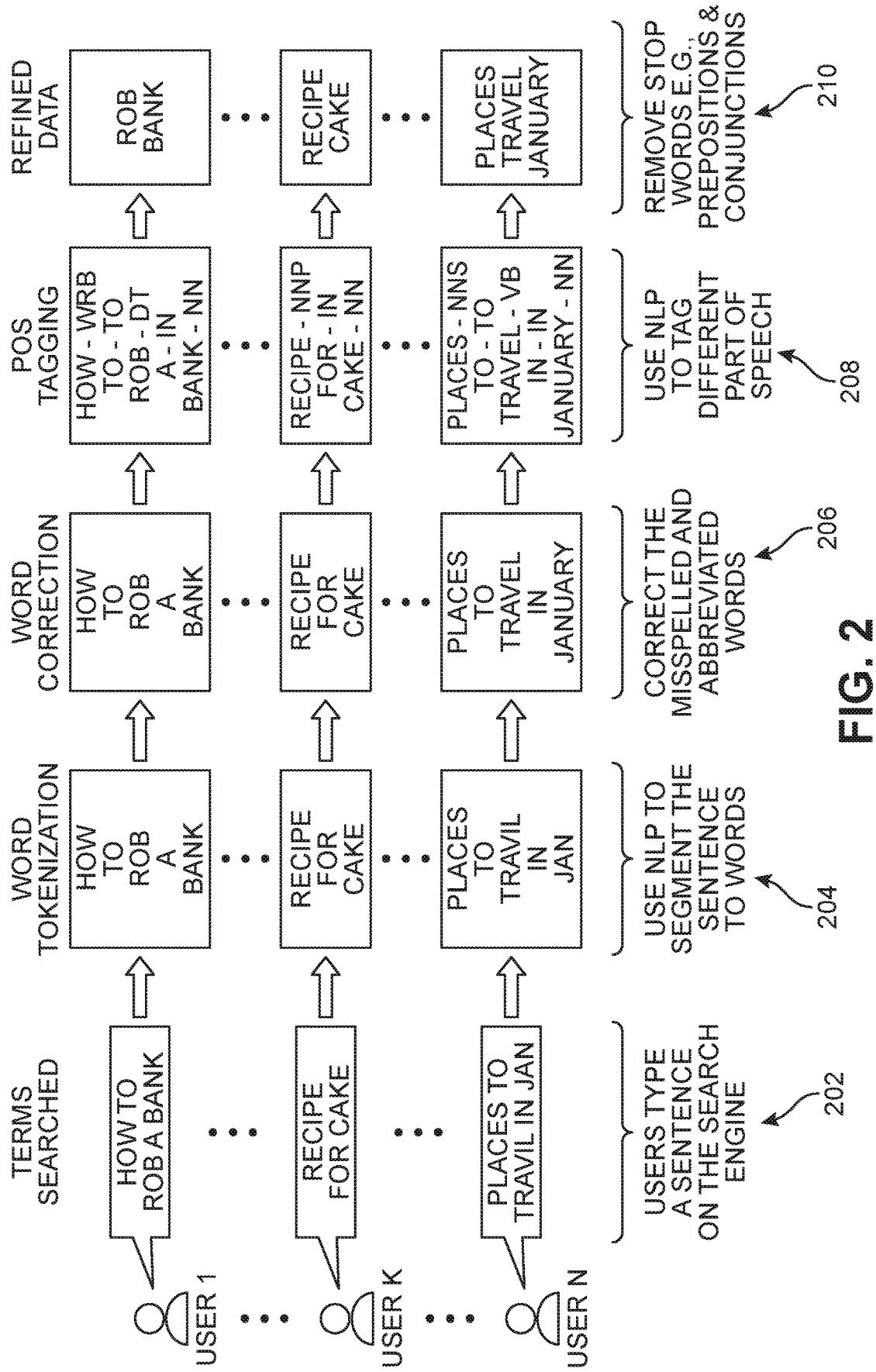
FIG. 2 is a schematic diagram of an embodiment of a first portion of preprocessing search terms in a search string.

The search string may include a word sequence, such as a phrase or sentence. As shown in FIG. 2, the search string typed into a search engine by users is obtained. In this case, user 1 has typed the search string "how to rob a bank", user K has typed "recipe for cake", and user N has typed "places to travil in jan." To make the search strings easier to process, the search strings may be preprocessed. Preprocessing may include tokenization. For example, as shown in FIG. 2 at 204, tokenization may include using Natural Language Processing ("NLP") to segment the search string into individual words. Preprocessing may include correcting misspelled words and/or associating words with their abbreviations appearing in search strings. For example, as shown in FIG. 2 at 206, the search string associated with user K is preprocessed by correcting the spelling of "travil" to "travel" and by changing the abbreviation of "Jan" to the month of "January." Preprocessing may include tagging part-of-speech ("POS") of the words in a search string. For example, as shown in FIG. 2 at 208, NLP can be used to tag the POS of each word.

For the search string of user 1, "how" is tagged as "WRB," which is a Wh-adverb. "To" is tagged as "TO," which is "to." "Rob" is tagged as "DT," which is "determiner." "A" is tagged as "IN," which is "preposition or subordinating conjunction." "Bank" is tagged as "NN," which is "Noun, singular or mass."

For the search string of user N, "recipe" is tagged as "NNP," which is "proper noun, singular." "For" is tagged as "IN." "Cake" is tagged as "NN."

For the search string of user K, "places" is tagged as "NNS," which is "Noun, plural." "To" is tagged as "TO." "Travel" is tagged as "VB," which is "Verb, base form." "In" is tagged "IN," which is "preposition or subordinating conjunction." "Jan" is tagged as "NN."

Preprocessing may further include refining the words from the search string by removing stop words, prepositions, and conjunctions. For example, as shown in FIG. 2 at 210, "how to rob a bank" is distilled down to "rob" and "bank." "Recipe for cake" is distilled down to "recipe" and "cake." "Places to travel in January" has been distilled down to "places," "travel," and "January."

Figure 3:
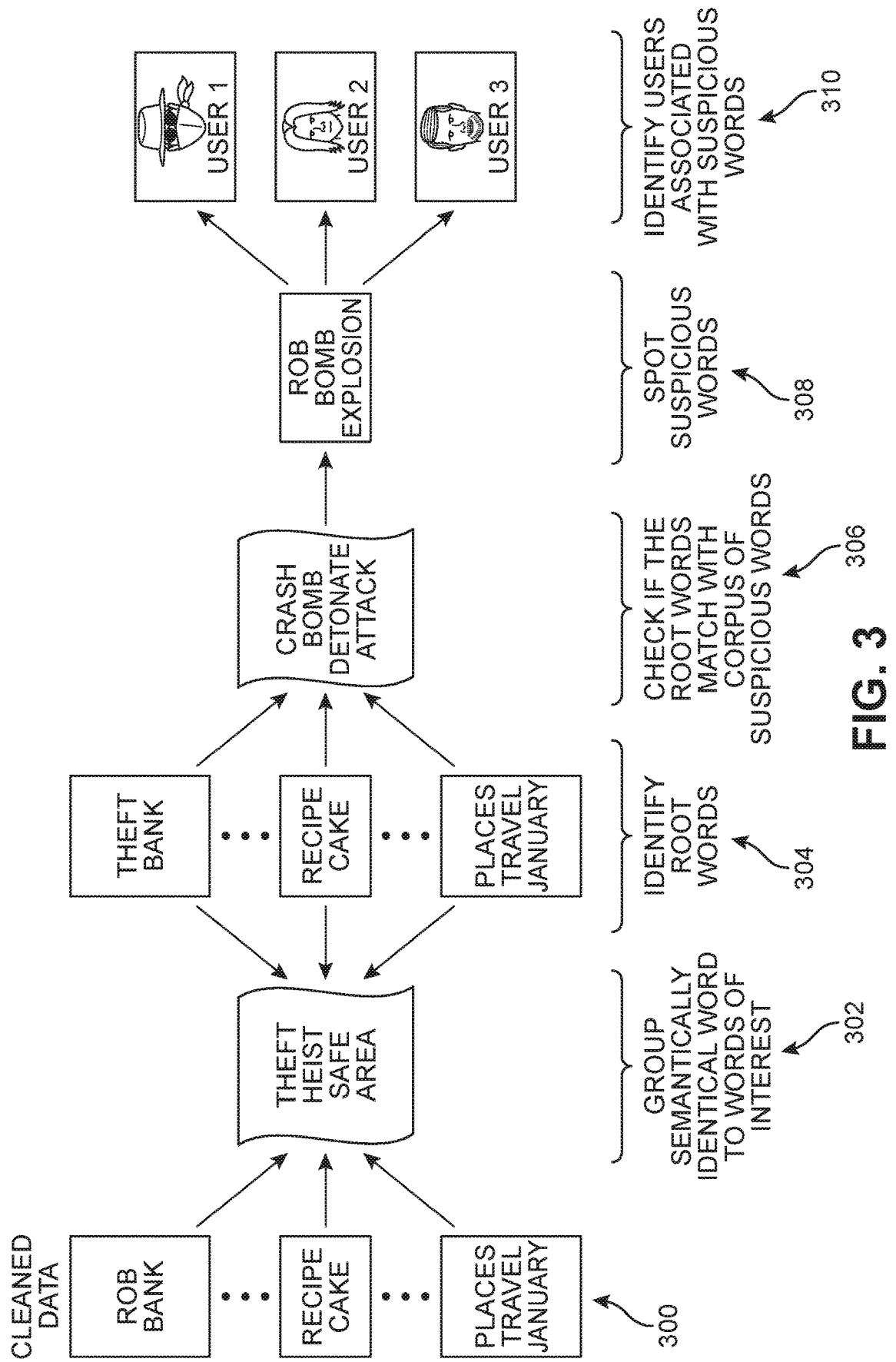
FIG. 3 is a schematic diagram of an embodiment of a second portion of preprocessing search terms in the search string.

Preprocessing may further include grouping semantically identical words to the words included in the search strings. For example, in some embodiments, a program like WordNet can be used to group semantically identical word to words of interest. In another example, as shown in FIG. 3 at 302, a list includes semantically identical words to the words included in the search strings.

Preprocessing may further include identifying root words from amongst the words in the search string. For example, FIG. 3 shows this operation at 304.

After preprocessing, the method may include searching the words of the search strings for suspicious words. For example, as shown in FIG. 3 at 306, the words of the search string are compared to words in a corpus of suspicious words. FIG. 3 also illustrates spotting the suspicious words amongst the search terms (operation 308).

In some embodiments, a live feed may be used for updating the corpus of suspicious words. This live feed can help improve the accuracy of finding search strings containing suspicious words, thus improving the accuracy of finding users associated with the suspicious search strings.

Figure 4:
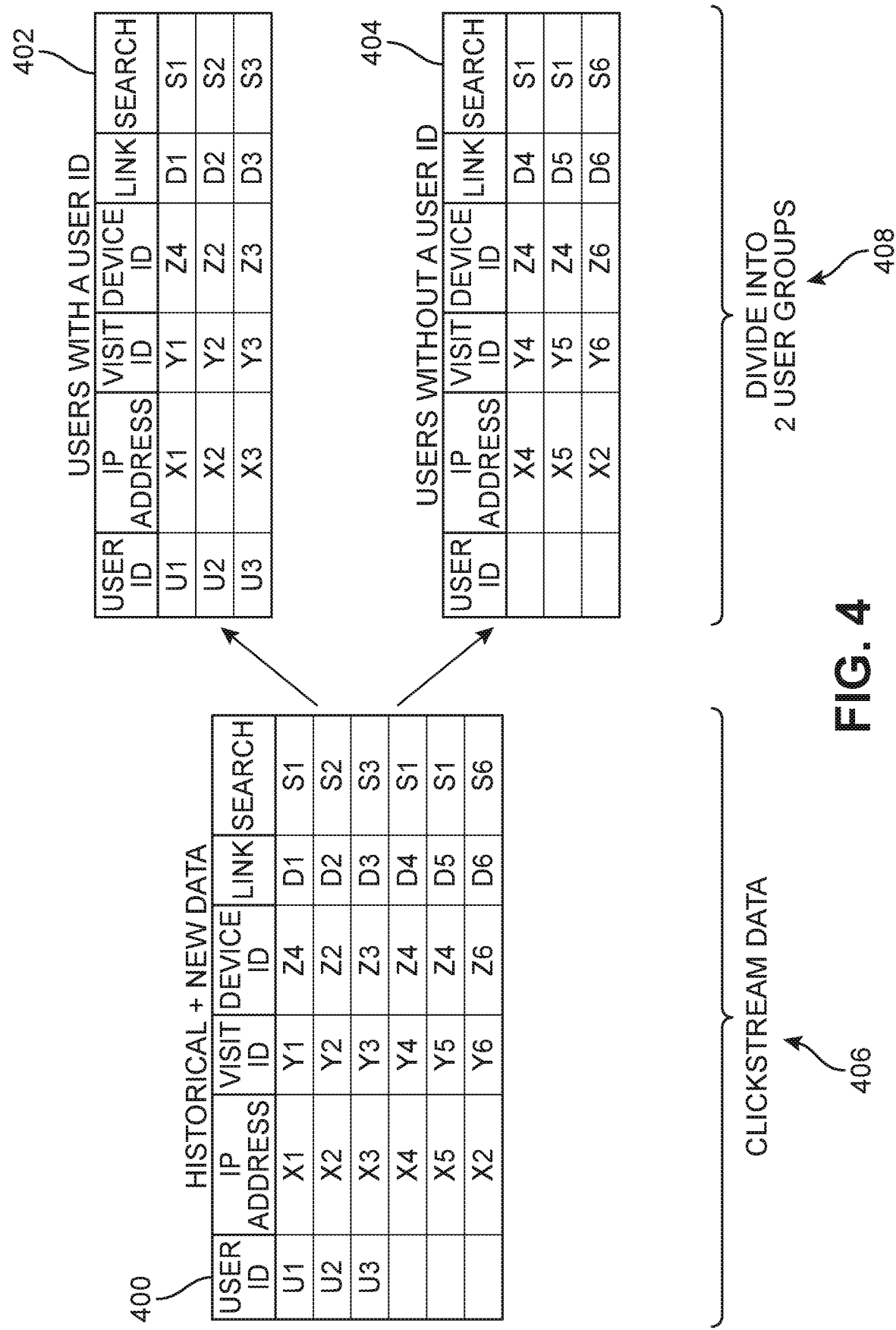
FIG. 4 is a schematic diagram of an embodiment of partitioning users into two groups: users with a user ID and users without a user ID.

After identifying suspicious words amongst search terms, the system and method may include identifying the users associated with the suspicious words. For example, as shown in FIG. 3 at 310, users associated with suspicious words are identified. In another example, method 1000 includes identifying a user associated with the identified search string (operation 1006). Identifying a user associated with suspicious words may include analyzing the clickstream data of the users. For example, as shown in FIG. 4 at 408, analyzing clickstream data 406 may include splitting clickstream data 406 into two groups: users with a known user ID and users without a known user ID. In some embodiments, the clickstream data may include:

User Id: Account login;
    IP address: Unique label assigned to device connected to
        computer network;
    Device Id: unique id of the device;
    Search: Terms searched by user;
    Visit ID: Cookie ID; and
    Link: Website Link.

Figure 5:
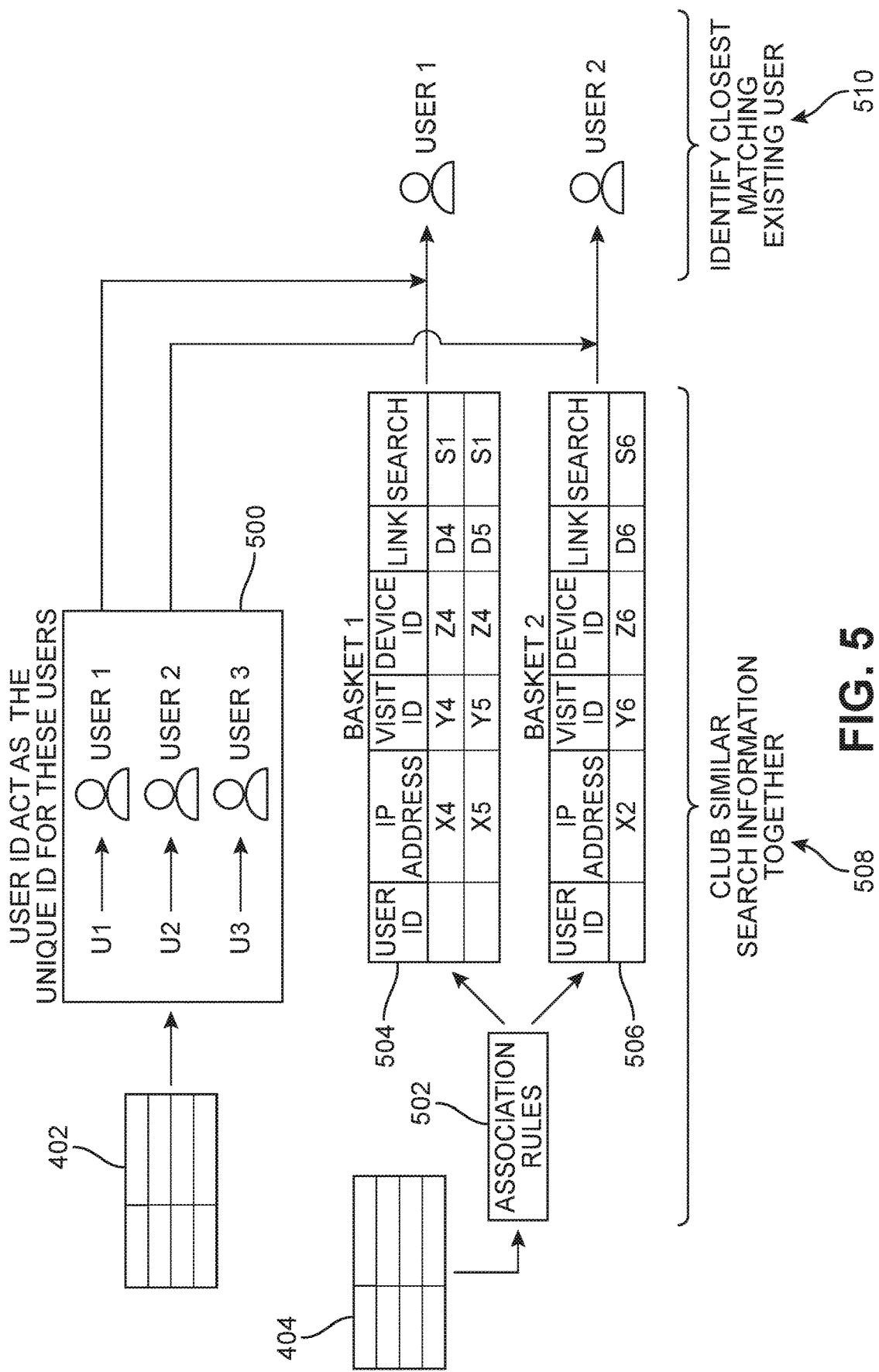
FIG. 5 is a schematic diagram of an embodiment of matching users with known user IDs with users without known user IDs.

In some embodiments, the user ID may be an account login, such as a Google user ID, YouTube user ID, or a Facebook user ID. As shown in FIG. 4, table 400 includes all of the users associated with the clickstream data that has been obtained. Table 400 is split into table 402, which includes users with a known user ID, and table 404, which includes users without a known user ID. By grouping the users based upon the presence of a known user ID, each group can be processed to determine which users without a known user ID match with users with a known user ID. FIG. 5 shows the matching process.

Identifying a user associated with suspicious words may include clubbing similar clickstream data together into groups. For example, as shown in FIG. 5, at operation 508, the information associated with searches of the users without a known user ID from table 402 (details of table 402 in FIG. 4) are clubbed together into groups, or "baskets", of users with similar information associated with searches. For example, in some embodiments, advanced machine learning techniques, such as association rules 502, may be applied to club similar clickstream data together using metrics. Examples of metrics include IP address, device Id, session ID, visit ID, website link, website uniform resource locator ("URL"), and/or search string. As shown in the example of FIG. 5, table 504 includes clickstream data containing device ID Z4 and search string S1. The clickstream data in table 504 is clubbed together into basket 1 because both sets of clickstream data include device ID Z4 and search string S1. Table 506 includes clickstream data that does not have any overlap in metrics with the clickstream data in table 504. The clickstream data in table 506 is by itself in basket 2 because this clickstream data does not share any metrics with other sets of clickstream data.

In some embodiments, a complex prescriptive analytics-based rule engine may be used to apply association rules for tagging search strings that have been clubbed together. In some embodiments, the rule engine may be designed to accommodate a situation where a user has multiple user devices (e.g., a tablet computer, a smartphone, a laptop computer, a desktop computer, or another type of computing device). For example, the rule engine may be able to identify that similar clickstream data is coming from multiple devices and may be able to use rules to identify that a single user corresponds to the multiple devices.

FIG. 5 shows that the users with known user IDs from table 402 (details of table 402 shown in FIG. 4) are used at 500 to match the users in basket 1 and basket 2 with user 1 and user 2.

For each basket, the closest matching user with a known user ID may be identified amongst the unknown users by using fuzzy logic mapping of historical and/or new metrics/attributes of the users with a known user ID. For example, FIG. 4 illustrates table 402 as showing that user 1 is associated with a set of clickstream data including device ID Z4 and search string S1. As shown in table 504, the two sets of clickstream data in basket 1 also contain device ID Z4 and search string S1. Thus, the two sets of clickstream data in basket 1 are identified as being associated with user 1 and are matched with user 1 in operation 510 in FIG. 5.

In another example of matching users to user IDs, table 404 (details of table 404 shown in FIG. 4) shows that user 2 is associated with a set of clickstream data including IP address X2. As shown in table 506, the set of clickstream data in basket 2 also contains IP address X2. Thus, the set of clickstream data in basket 2 is identified as being associated with user 2 and is matched with user 2 in operation 510 in FIG. 5.

The disclosed system and method may include analyzing the clickstream data associated with the identified user(s) to assign a score to the user(s) based upon the likelihood that the user will engage in illicit behavior. For example, upon associating sets of clickstream data containing suspicious search strings user IDs, the clickstream data of the users associated with these user IDs may be analyzed to determine a score indicating the likelihood that the person associated with the user ID is going to engage in illicit behavior. Method 1000 includes an example at operation 1008. Artificial intelligence may be used to perform operation 1008. For example, as discussed below in more detail, machine learning may be used to select variables to use in scoring users. In such an example, machine learning may also be used to use the variables to assign scores to the users that indicate the likelihood that the users will engage in illicit behavior. In some embodiments, the ingestion of new data may trigger a new machine learning model build. For example, a new set of data may trigger another round of variable selection and machine learning model building to score users. In this way, the variables and machine learning techniques with the best prediction can be selected and used for each set of data. Customizing the variables and machine learning technique for each new set of data enhances the accuracy of the machine learning model with each use.

During variable selection, certain variables may be obtained from the user analytical records. For example, the variables may include browser type (e.g., Firefox or Chrome), navigation type, device used, operating system, time spent on clickstream data, and/or number of websites visited. Each variable may have a different range of values. For example, in some embodiments in which the use of Firefox is a variable, a value of 1 may be used to indicate that a user is using Firefox and a 0 may be used to indicate that a user is not using Firefox. In another example in which time spent on a certain website is a variable, the duration in seconds may be used to indicate the time spent on the website. Some of the variables may be captured in the clickstream feed itself and other variables may be derived from other information captured in the clickstream. Table 1 below shows an embodiment in which a set of three variables (V1, V2, and V3) are correlated to each of users 1-5.

TABLE 1

| Original Variables Associated with Users 1-5 | | | |
| --- | --- | --- | --- |
| User ID | V1 | V2 | V3 |
| 1 | 2.3 | 2 | 124 |
| 2 | 4.1 | 3 | 132 |
| 3 | 3.4 | 4 | 133 |
| 4 | 5.5 | 6 | 160 |
| 5 | 10.9 | 9 | 231 |
| 6 | 2.3 | 13 | 190 |

Based on the nature of each variable, a transformation function (e.g., scaling, logarithmic transformation, exponentiation) may be applied to transform the variables into numbers that are better for comparison. For example, in Table 2 below, V4, V5, and V6 are variables created by applying a transformation function to each of variables V1, V2, and V3. The creation of more variables using transformation functions may be performed to new data as it is obtained. For example, the transformation function may be applied to V1, V2, and V3 at this moment in time, and then the transformation function may be applied to a different set of variables at another moment in time. In some embodiments, multiple transformation functions are applied to the variables, and the transformation function resulting in the best data for comparison of variables is selected.

TABLE 2

Original Variables and Transformed Variables Associated with Users 1-5

| User ID | V1 | V2 | V3 | V4 | V5 | V6 |
|---|---|---|---|---|---|---|
| 1 | 2.3 | 2 | 124 | 0.8 | 0.7 | 0.5 |
| 2 | 4.1 | 3 | 132 | 1.4 | 1.1 | 0.6 |
| 3 | 3.4 | 4 | 133 | 1.2 | 1.4 | 0.6 |
| 4 | 5.5 | 6 | 160 | 1.7 | 1.8 | 0.7 |
| 5 | 10.9 | 9 | 231 | 2.4 | 2.2 | 1.0 |
| 6 | 2.3 | 13 | 190 | 0.8 | 2.0 | 0.8 |

As the clickstream data analyzed includes live real time data, the disclosed system and method save computational time and infrastructure cost by processing the variables in batches. For example, instead of processing all of the users shown in Table 2 at one time, the users are horizontally partitioned into batches. In such an example, batch 1 would include the variables for users 1 and 2 (see Table 3 below), batch 2 would include the variables for users 3 and 4 (see Table 4 below), and batch 3 would include the variables for users 5 and 6 (see Table 5 below). The rows across batches are mutually exclusive.

TABLE 3

Batch 1

| User ID | V1 | V2 | V3 | V4 | V5 | V6 |
|---|---|---|---|---|---|---|
| 1 | 2.3 | 2 | 124 | 0.8 | 0.7 | 0.5 |
| 2 | 4.1 | 3 | 132 | 1.4 | 1.1 | 0.6 |

TABLE 4

Batch 2

| User ID | V1 | V2 | V3 | V4 | V5 | V6 |
|---|---|---|---|---|---|---|
| 3 | 3.4 | 4 | 133 | 1.2 | 1.4 | 0.6 |
| 4 | 5.5 | 6 | 160 | 1.7 | 1.8 | 0.7 |

TABLE 5

Batch 3

| User ID | V1 | V2 | V3 | V4 | V5 | V6 |
|---|---|---|---|---|---|---|
| 5 | 10.9 | 9 | 231 | 2.4 | 2.2 | 1.0 |
| 6 | 2.3 | 13 | 190 | 0.8 | 2.0 | 0.8 |

While the exemplary embodiment includes two users per batch, it is understood that the batches may be divided into different numbers of users. The number of users per batch may be selected based on a variety of factors. For example, the number of users per batch may be selected based on the number of variables, the amount of time it takes to process a batch with a certain number of users, and/or the total amount of information to be processed. The batches may each include composite variables as a function of time t, which captures the impact of the same user in different time frames. For example, if there are in total 5 time frames (t=1,2,3,4,5) then each batch would contain users from all the five time frames.

Figure 6:
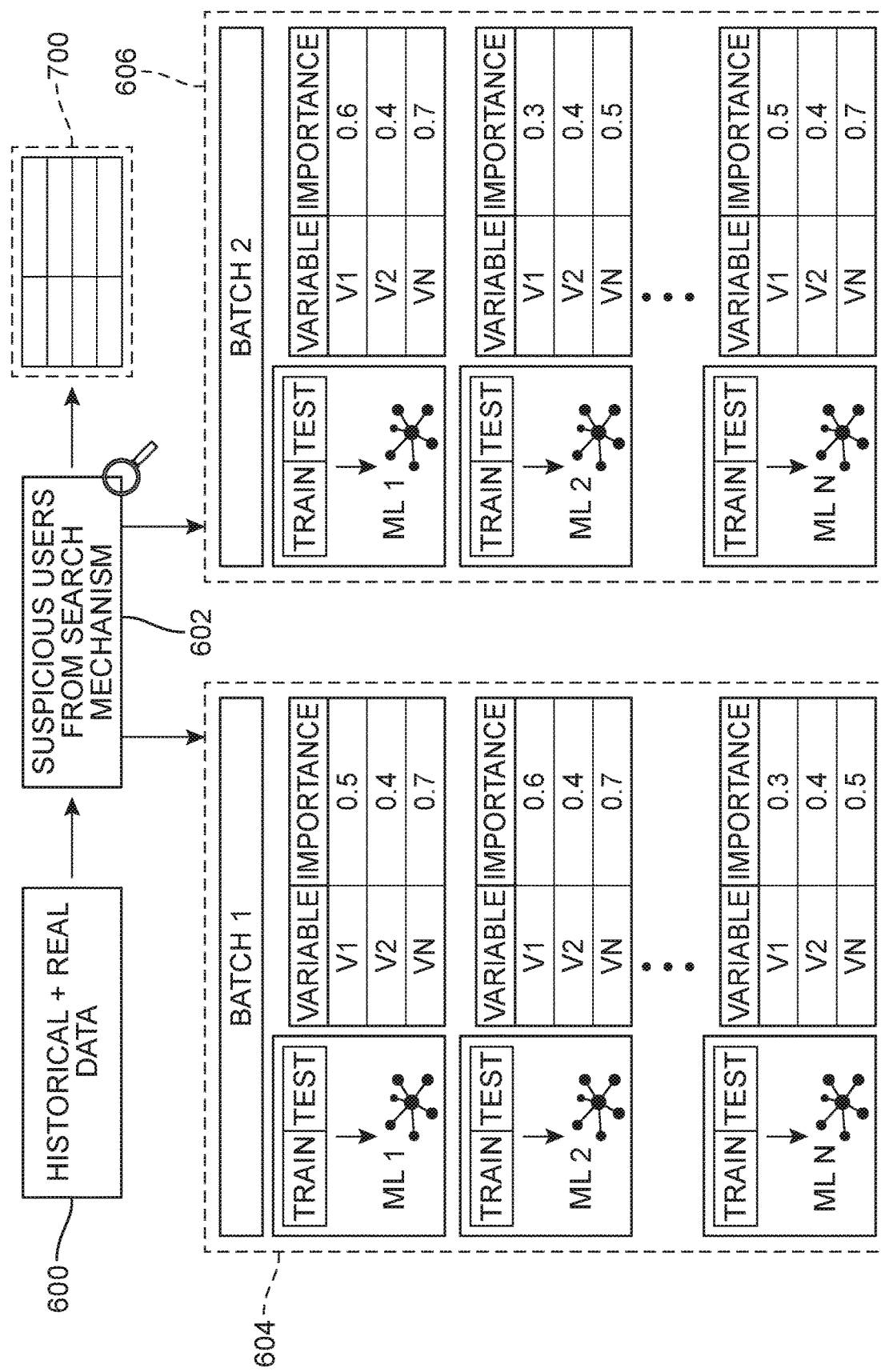
FIGS. 6-7 are schematic diagrams of an embodiment of applying machine learning models to multiple batches of variables.
Figure 7:
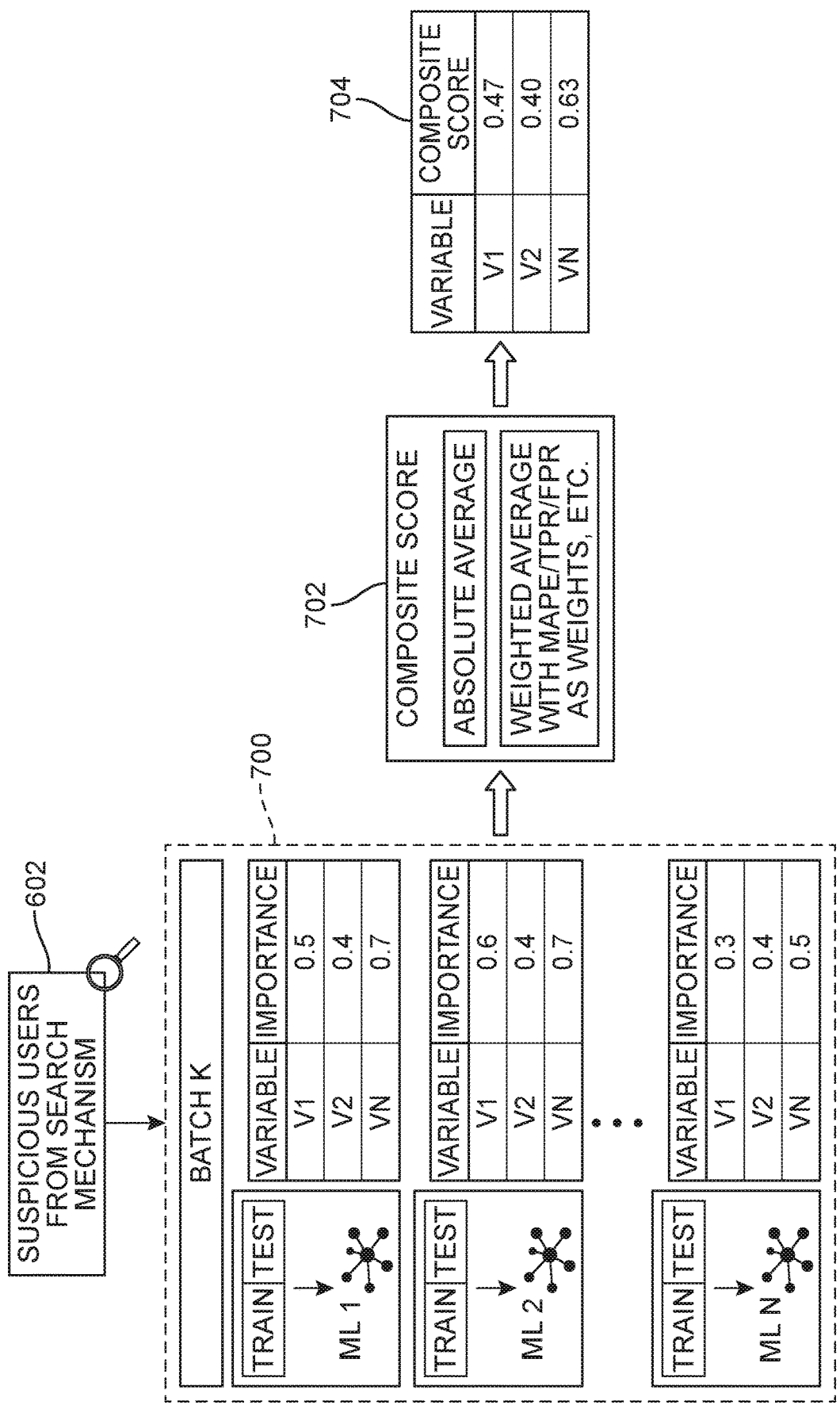

For each batch, different machine learning models (e.g., Random Forest, Support Vector Machine, Gradient Boosting Machine, and XGBoost) may be applied to the variables of each batch to generate variable importance. For each variable, the machine learning models may be run simultaneously. FIGS. 6 and 7 show how historical and real time data 600 may be analyzed to find suspicious searches, as discussed in more detail above, and these suspicious searches may then be further analyzed to identify users 602 associated with the suspicious searches by the techniques discussed above. Then, multiple machine learning models are applied to variables associated with users 602 in batch 1, batch 2, and batch K. As shown in FIGS. 6 and 7, machine learning models 1 through N are applied to the variables of batch 1 at 604, machine learning models 1 through N are applied to the variables of batch 2 at 606, and machine learning models 1 through N are applied to the variables of batch K at 700 (details of table 700 in FIG. 7). The application of the machine learning models to the variables generates variable importance corresponding to each machine learning model within each batch. In FIGS. 6-7, K refers to the total number of batches and N refers to the total number of machine learning models.

As shown in FIG. 7, importance across all the batches are aggregated at 702 to create a final composite score at 704. In some embodiments, the final score may be created using an absolute average and a weighted average with mean absolute percentage error ("MAPE"), true positive rate ("TPR"), and false positive rate ("FPR"), as weights. TPR is the proportion of actual positive correctly identified. FPR is the proportion of actual negative wrongly classified as positive. Below are examples of equations of absolute average and weighted averages:

Method 1: Absolute Average $$V1 = \frac{V_{11} + V_{21} + \ldots + *V_{kn}}{\text{Total number of models (kn)}}$$

Method 2: Weighted Average $$V1 = \frac{AUC_{11} * V_{11} + AUC_{21} * V_{21} \ldots + AUC_{kn} * V_{kn}}{AUC_{11} + +AUC_{21} \ldots + AUC_{kn}}$$

Method 3: Weighted Average $$V1 = \frac{TPR_{11} * V_{11} + TPR_{21} * V_{21} + \ldots + TPR_{kn} * V_{kn}}{TPR_{11} + +TPR_{21} + \ldots + TPR_{kn}}$$

Method 4: Weighted Average $$V1 = \frac{FPR_{11} * V_{11} + FPR_{21} * V_{21} + \ldots + FPR_{kn} * V_{kn}}{FPR_{11} + +FPR_{21} + \ldots + FPR_{kn}}$$

In the above equations, k refers to the total number of batches, n refers to the total number of machine learning algorithms, and AUC refers to area under the curve.

Once the final composite scores are found for each variable, one or more variables with the maximum importance may be selected. The maximum importance may be determined based on a variety of factors that are either preset or are determined on a case-by-case basis. For example, in some embodiments, the maximum importance may be determined on a case-by-case basis according to ranges and/or distribution of values calculated for the final composite scores in each case. In some embodiments, the maximum importance may be simply the variable having the highest final composite score. In the embodiment of FIG. 7, the final composite scores for V1, V2, and VN are 0.47, 0.40, and 0.63. In such an embodiment, VN may be selected because it has the highest composite score of 0.63. In some embodiments, the maximum importance may be determined by a threshold. For example, the maximum importance may be determined by a threshold value, threshold percentile, or threshold range for the final composite scores.

Figure 8:
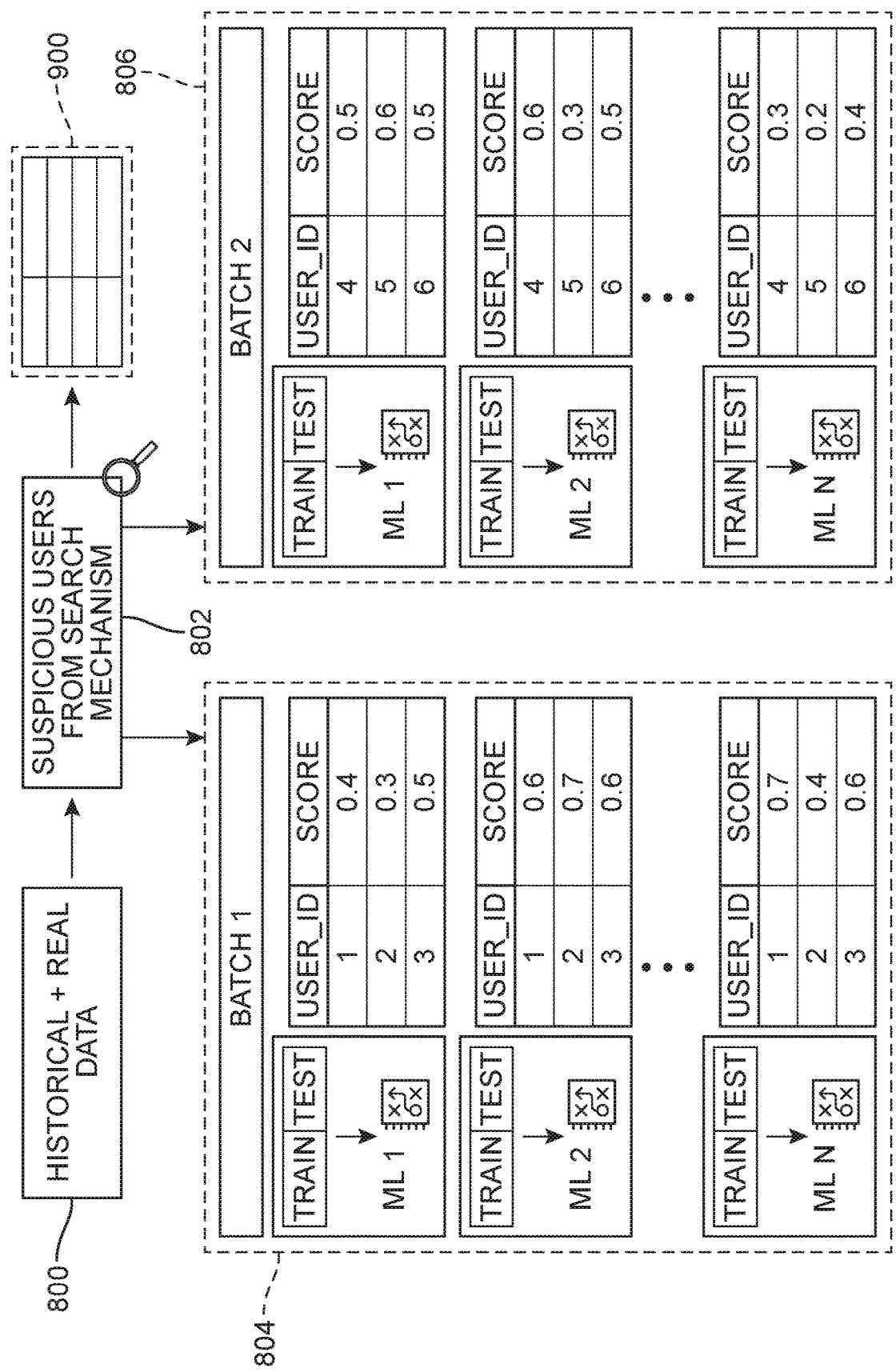
FIGS. 8-9 are schematic diagrams of an embodiment of building machine learning models for multiple batches of users.
Figure 9:
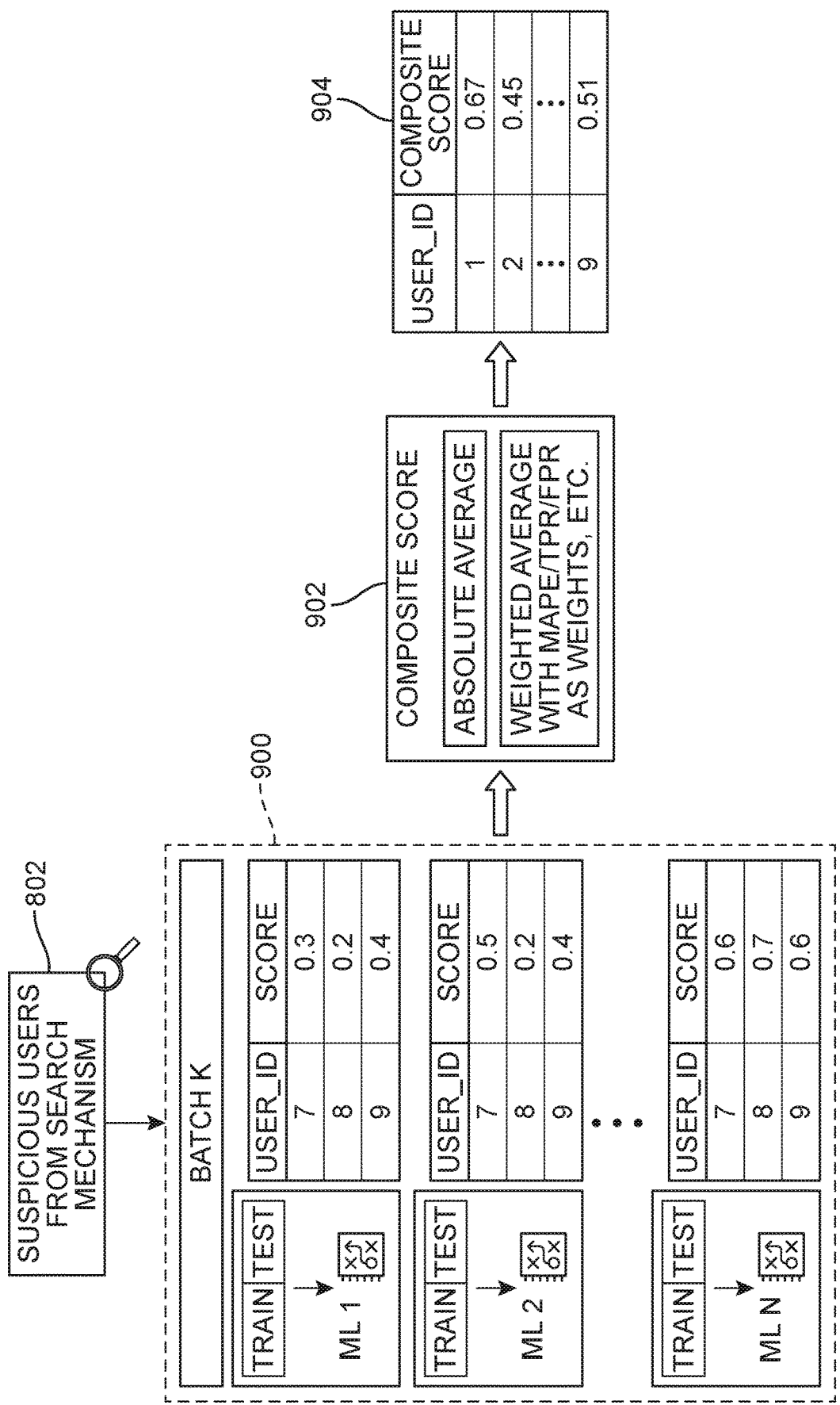

Once the variable or variables having the maximum importance are selected, these variables may be used to build machine learning models that calculate a final composite score for each user associated with a suspicious search string. To calculate the final composite score for each user, the users may again be partitioned horizontally into batches to save computational time and infrastructure cost by processing the information in batches. For each batch, different machine learning models (e.g., Random Forest, Support Vector Machine, Gradient Boosting Machine, and XGBoost) may be applied to each batch to generate a final composite score (e.g., probability) for each user. For each user, the machine learning models may be run simultaneously. FIGS. 8 and 9 show how historical and real time data 800 may be analyzed to find suspicious searches, as discussed in more detail above, and these suspicious searches may then be further analyzed to identify users 802 associated with the suspicious searches by the techniques discussed above. Then, multiple machine learning models are applied to users 802 in batch 1, batch 2, and batch K. As shown in FIGS. 8 and 9, machine learning models 1 through N are applied to batch 1 at 804, machine learning models 1 through N are applied to batch 2 at 806, and machine learning models 1 through N are applied to batch K at 900 (details of table 900 in FIG. 9). The application of the machine learning models to the batches generates user scores corresponding to each machine learning model within each batch. In FIGS. 8-9, K refers to the total number of batches and N refers to the total number of machine learning models.

As shown in FIG. 9, scores across all the batches are aggregated at 902 to create a final composite score at 904. In some embodiments, the final score may be created using an absolute average and a weighted average with MAPE, TPR, and FPR, as weights in the same manner discussed above with respect to variable selection.

In some embodiments, the user scores may be ranked as low, medium, and high, corresponding to the level of risk the user poses. For example, in some embodiments, low, medium, and high classification could be assigned based on the percentile distribution of the scores. In a more specific example, scores less than the $33^{rd}$ percentile could be assigned as "low", scores in the range of the $33^{rd}$ percentile to $66^{th}$ percentile could be assigned as "medium", and scores in the range above the $66^{th}$ percentile as "high". Users with a high score may be more likely to engage in illicit behavior.

In some embodiments, the method may be performed on a fixed basis. For example, the method may be performed daily, weekly, or monthly. In another example, real time scoring may be performed daily, weekly, or monthly.

In some embodiments, scoring results from different time periods may be stored in a centralized server on a real time basis. These results may then be pushed to local servers on a set frequency (e.g., daily, weekly, or monthly). The scoring results may be transmitted from local servers to particular people and/or agencies via other communication channels, e.g., SMS, email, etc.

The system and method may include performing a preventive measure based upon the score. FIG. 10 shows an example of this operation at 1010. In some embodiments, the decision to perform preventive measures may be based on a user's score. For example, preventive measures may be performed when a user has a high score. In some embodiments, preventive measures may include one or more of: notifying an authority of the predicted illicit behavior; blocking a user from a particular website or webpage or file access; blocking a user from purchasing a particular product or service; and continuing to monitor the user's clickstream data. Notifying an authority may encourage the authority to monitor and/or investigate the user. In the case of criminal activity the authority could be a law enforcement authority. In the case of civilly prohibited behavior such as trade secret misappropriation the authority could be a corporate information security authority. Blocking the user from a particular website or webpage or file access may prevent the user from obtaining information useful in engaging in particular illicit activity and/or communicating with others who may collaborate with the user in such activity. Blocking a user from purchasing a particular product or service may prevent a user from utilizing the product or service in the illicit activity. Monitoring the user's clickstream data may help identify if the user's behavior escalates. In some embodiments, a medium score may trigger a preventive measure, e.g. continued monitoring.

In some embodiments, in addition to using the identification of suspicious users to perform preventative measures against illicit activity, the identification of suspicious users may be used to find the location of the suspicious users and to identify geographic areas that are more susceptible to illicit activity. In this way, illicit activity may be predicted and prevented on an even larger scale. For example, outreach programs may be created and implemented in communities to prevent children from becoming involved in illicit activity in the future. In another example, neighborhood watch groups may be established. In yet another example, law enforcement authorities may direct uniformed officers to patrol certain areas more often than others, or dispatch unmanned aerial vehicles (UAVs) to certain areas to surveil for illicit activity.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An artificial intelligence based method of predicting and preventing illicit behavior, comprising:
    obtaining internet data, including search string data and clickstream data, wherein the search string data includes one or more words;
    analyzing the search string data to identify a search string containing one or more words that match with one or more suspicious words provided in a suspicious word corpus;
    identifying a user associated with the identified search string;
    analyzing the clickstream data associated with the identified user to assign a score to the user based upon the likelihood that the user will engage in illicit behavior; and
    performing a preventive measure based upon the score.

2. The artificial intelligence based method of claim 1, wherein the preventive measure includes one or more of:
- notifying an authority of the predicted illicit behavior;
- blocking a user from a particular website or webpage or file access;
- blocking a user from purchasing a particular product or service; and
- continuing to monitor the user's clickstream data.

3. The artificial intelligence based method of claim 1, wherein analyzing the clickstream data associated with the identified user includes applying multiple machine learning models to at least one variable.

4. The artificial intelligence based method of claim 1, wherein analyzing the clickstream data associated with the identified user includes horizontal partitioning of user analytical records into batches.

5. The artificial intelligence based method of claim 1, wherein analyzing the clickstream data associated with the identified user includes applying multiple machine learning models to each variable of a plurality of variables at a first time frame and applying multiple machine learning models to each variable of the same plurality of variables at a second time frame.

6. The artificial intelligence based method of claim 5, wherein analyzing the clickstream data associated with the identified user includes determining a composite score for each variable of the plurality of variables.

7. The artificial intelligence based method of claim 1, wherein the score of the user associated with the identified search string is higher than a threshold score indicating a strong likelihood of engaging in illicit activity.

8. A non-transitory computer-readable medium storing software comprising instructions executable by one or more computers which, upon such execution, cause the one or more computers to:
- obtain internet data, including search string data and clickstream data, wherein the search string data includes one or more words;
- analyze the search string data to identify a search string containing one or more words that match with one or more suspicious words provided in a suspicious word corpus;
- identify a user associated with the identified search string;
- analyze the clickstream data associated with the identified user to assign a score to the user based upon the likelihood that the user will engage in illicit behavior; and
- perform a preventive measure based upon the score.

9. The non-transitory computer-readable medium storing software of claim 8, wherein the preventive measure includes one or more of:
- notifying an authority of the predicted illicit behavior;
- blocking a user from a particular website or webpage or file access;
- blocking a user from purchasing a particular product or service; and
- continuing to monitor the user's clickstream data.

10. The non-transitory computer-readable medium storing software of claim 8, wherein analyzing the clickstream data associated with the identified user includes applying multiple machine learning models to at least one variable.

11. The non-transitory computer-readable medium storing software of claim 8, wherein analyzing the clickstream data associated with the identified user includes horizontal partitioning of user analytical records into batches.

12. The non-transitory computer-readable medium storing software of claim 8, wherein analyzing the clickstream data associated with the identified user includes applying multiple machine learning models to each variable of a plurality of variables at a first time frame and applying multiple machine learning models to each variable of the same plurality of variables at a second time frame.

13. The non-transitory computer-readable medium storing software of claim 12, wherein analyzing the clickstream data associated with the identified user includes determining a composite score for each variable of the plurality of variables.

14. The non-transitory computer-readable medium storing software of claim 8, wherein the score of the user associated with the identified search string is higher than a threshold score indicating a strong likelihood of engaging in illicit behavior.

15. An artificial intelligence based system for predicting and preventing illicit behavior, comprising:
- one or more computers and one or more storage devices storing instructions that are operable, when executed by the one or more computers, to cause the one or more computers to:
  - obtain internet data, including search string data and clickstream data, wherein the search string data includes one or more words;
  - analyze the search string data to identify a search string containing one or more words that match with one or more suspicious words provided in a suspicious word corpus;
  - identify a user associated with the identified search string;
  - analyze the clickstream data associated with the identified user to assign a score to the user based upon the likelihood that the user will engage in illicit behavior; and
  - perform a preventive measure based upon the score.

16. The artificial intelligence based system for predicting and preventing illicit behavior of claim 15, wherein the preventive measure includes one or more of:
- notifying an authority of the predicted illicit behavior;
- blocking a user from a particular website or webpage or file access;
- blocking a user from purchasing a particular product or service; and
- continuing to monitor the user's clickstream data.

17. The artificial intelligence based system for predicting and preventing illicit behavior of claim 15, wherein analyzing the clickstream data associated with the identified user includes applying multiple machine learning models to at least one variable.

18. The artificial intelligence based system for predicting and preventing illicit behavior of claim 15, wherein analyzing the clickstream data associated with the identified user includes horizontal partitioning of user analytical records into batches.

19. The artificial intelligence based system for predicting and preventing illicit behavior of claim 15, wherein analyzing the clickstream data associated with the identified user includes applying multiple machine learning models to each variable of a plurality of variables at a first time frame and applying multiple machine learning models to each variable of the same plurality of variables at a second time frame.

20. The artificial intelligence based system for predicting and preventing illicit behavior of claim 19, wherein analyzing the clickstream data associated with the identified user includes determining a composite score for each variable of the plurality of variables.

\* \* \* \* \*